June 30, 1964 N. B. MEARS 3,139,392

METHOD OF FORMING PRECISION ARTICLES

Filed Aug. 10, 1959 2 Sheets-Sheet 1

INVENTOR
NORMAN B. MEARS
BY John E. Stryker
ATTORNEY

INVENTOR

NORMAN B. MEARS

BY John E. Stryker

ATTORNEY

United States Patent Office
3,139,392
Patented June 30, 1964

3,139,392

METHOD OF FORMING PRECISION ARTICLES

Norman B. Mears, Dakota County, Minn.
(1170 Dodd Road, St. Paul, Minn.)

Filed Aug. 10, 1959, Ser. No. 832,636
2 Claims. (Cl. 204—15)

This invention relates to a method of forming reinforced precision articles having extremely minute apertures in metal components of sizes and shapes which cannot be produced by known mechanical or etching procedures.

In the field of modern electronics and certain other fields, elements of microscopic size are required and many of these elements must be provided with apertures of sizes and shapes which cannot be formed by conventional methods. Groups of such microscopic elements are frequently required in predetermined accurately spaced relation one to another. To facilitate the assembly of such elements in the finished devices, supporting carrier members of relatively large size may be required.

It is an object of my invention to provide a method for making such elements having apertures of the required precise sizes and shapes in predetermined accurately located relation one to another.

A further object is to provide a method of forming such apertured elements which combines photo-printing, electroforming and etching techniques.

A particular object is to provide a novel method of forming wire conductors of extremely fine sizes, e.g., on the order of a few ten thousandths of an inch in width and thickness, in predetermined accurately spaced relation one to another and having connected carrier members of relatively greater width and thickness whereby the assembly of the wires in electric circuits is facilitated.

Other objects will appear from and be pointed out in the following specification and claims.

In the accompanying drawings one embodiment of a precision article and my preferred procedure for making it are illustrated by way of example and not for the purpose of limitation.

Referring to the drawings:

FIGURE 1 is a somewhat schematic plan view of the finished article;

FIGS. 2, 3 and 4 are fragmentary cross sectional views on a larger scale taken respectively on the lines 2—2, 3—3 and 4—4 of FIG. 1;

Figure 7:
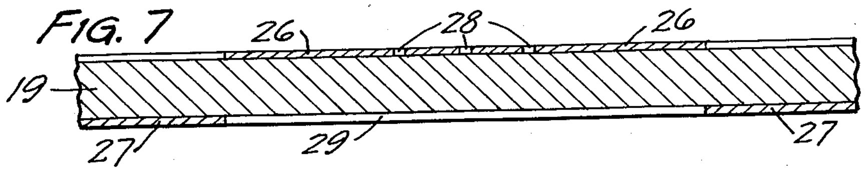
Figure 8:
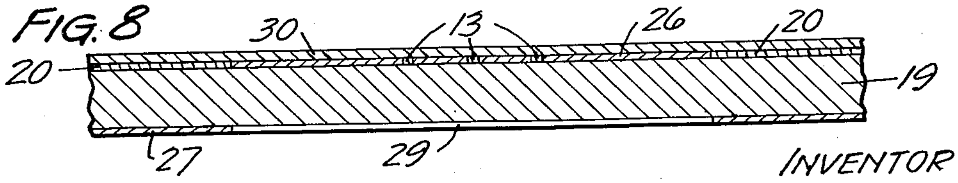

FIG. 7 is a fragmentary cross sectional view showing the base sheet with resist coatings on both sides and showing developed bare areas for electro-plating on the first or top side of the sheet and bare aperture areas on the second or bottom side, and FIG. 8 is a similar cross sectional view illustrating a later step in the process wherein the elements on the first or top side of the base sheet have been electro-formed and supported by an overlying coating preparatory to etching to form apertures extending through the sheet from the second side.

Figure 1:
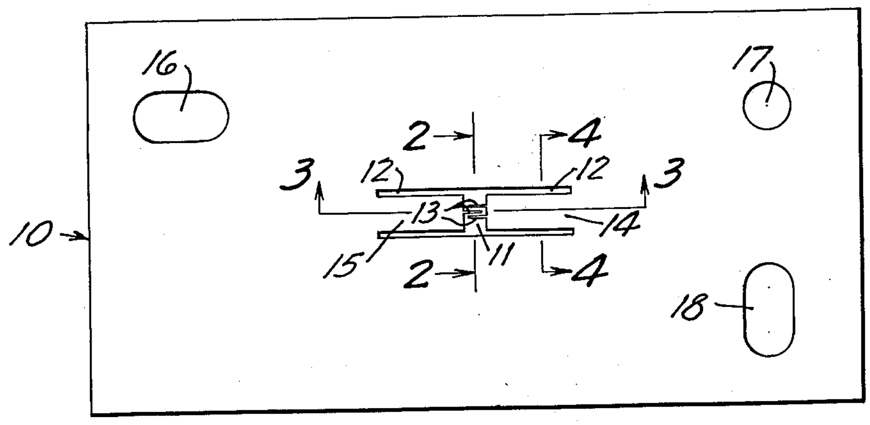

As shown in FIG. 1, the illustrated article comprises a metal body indicated generally by the numeral 10 formed with aperture areas including an H-shaped aperture area having a central portion 11 and four arms 12. Fine wires 13 extend in parallel relation one to another across the aperture portion 11. Two of the wires 13 are integral with a carrier member 14 and a third wire is shown integral with a carrier member 15. Parallel sides of the carrier members 14 and 15 are defined by the aperture arms 12. The body 10 is also formed with locator or indexing perforations indicated at 16, 17 and 18. These perforations, like the other aperture areas of the article must be positioned in precisely located and spaced relation to the other elements of the article and must be of sizes within close tolerances.

Figure 2:
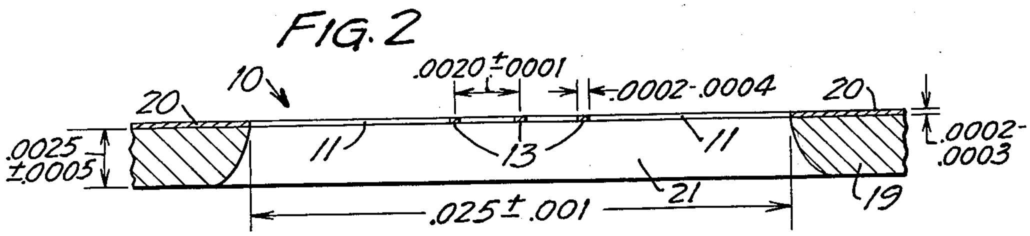
Figure 3:
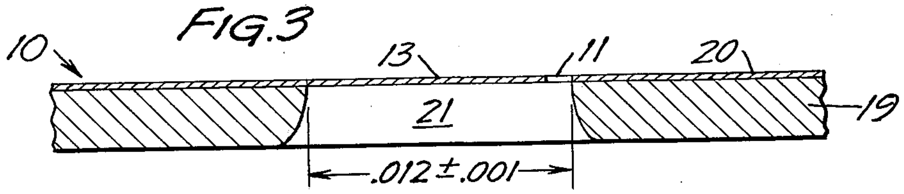
Figure 4:
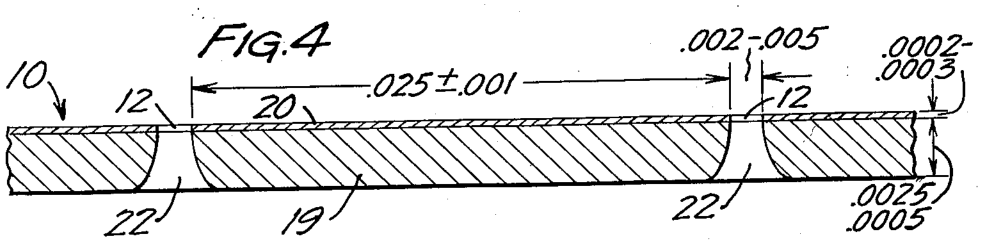

Perforations 16 and 18 are elongated slots, and the perforation 17 is a circular hole, as shown. Typical sizes and dimensions for the apertures are indicated in FIGS. 2–4 for an article which comprises a body 10 three-quarters of an inch long and three-eighths of an inch wide. For example, the slot 16, according to a typical specification, must be .045 inch, plus or minus .001 inch, wide and .090, plus or minus .001 inch, long and must be located on a center which is spaced from the center of the hole 17 .660 inch, plus or minus .001 inch. The diameter of hole 17 is .045 inch, plus or minus .001 inch.

Referring to FIGS. 2, 3 and 4, the metal body indicated generally by the numeral 10 comprises a base sheet 19 formed from a first metal and a relatively much thinner electro-formed film 20 of a second metal on one face of the sheet 19. The fine wires 13 are electro-formed elements extending across the aperture area 11, and the aperture areas 11 and 12 are defined and surrounded by electro-formed portions of the film 20. Aperture areas 21 (FIGS. 2 and 3) and 22 (FIG. 4) are formed by etching through the base sheet 19 in registry with the aperture areas of the electro-formed film 20. Similar etched aperture areas extend through the sheet 19 in registry with each of the locator slots 16 and 18 and the locator hole 17. Registry within a tolerance of plus or minus .0001 inch is feasible if required.

Typical dimensions of the several apertures in inches and typical tolerances are indicated in FIGS. 2–4. A feature of this particular article is the accurate location and sizes of the apertures and provision of the fine conductor wires 13 which, as indicated, may be from .0002 to .0004 inch in width and from .0002 to .0003 inch in thickness, as determined by the thickness of the electro-formed film 20.

Figure 5:
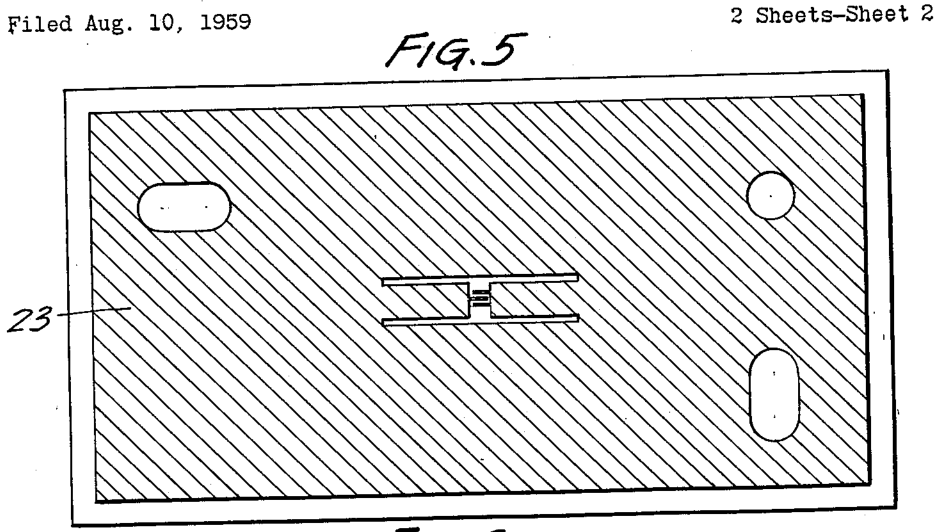
FIG. 5 is a schematic plan view showing a master printing plate for use in photo-printing on one side of a base sheet a predetermined pattern precisely defining aperture areas and surrounding areas to be electro-plated.
Figure 6:
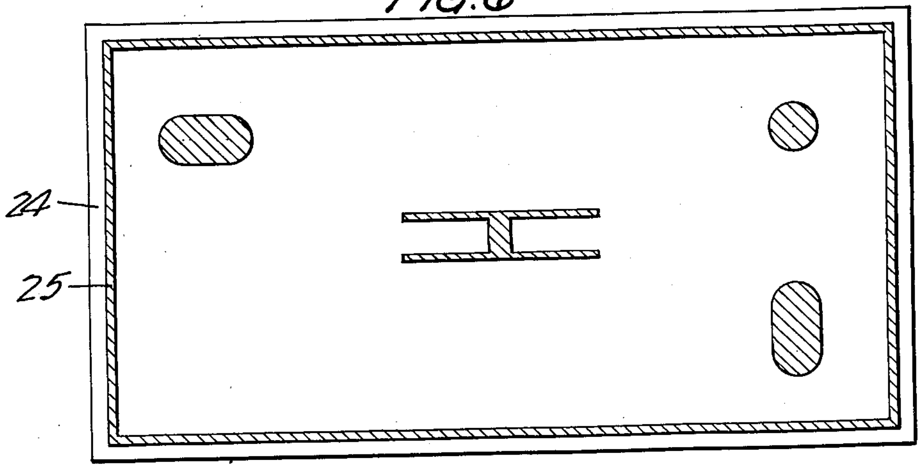
FIG. 6 is a similar view of a photographic film for use in photo-printing the aperture designs on the second side of the base sheet.

In forming the precision article hereinbefore described, I use photographic plates or film such as those illustrated in FIGS. 5 and 6. In FIG. 5 a glass photographic master plate is indicated at 23 and is provided with opaque areas, indicated by the cross hatching, accurately defining the pattern to be reproduced by photo-printing on one side of the body sheet 19. The plate shown in FIG. 5 may be considered to be a positive plate in that the shaded areas define the areas of the base sheet to be electro-plated. In FIG. 6 a negative film 24 is shown having the image of a pattern similar to that of the plate 23 but in reverse, and also having a border line 25 representing the outline of the article to be formed. The shaded areas of the film 24 define the areas which are to be etched from the second or lower side of the base sheet 19 after the image of the film has been photo-printed on the base sheet. This base sheet may be rolled or otherwise formed from suitable metal, such as copper, nickel, zinc, etc., and should be of substantially uniform thickness not exceeding .01 inch.

According to my improved method, both sides of the base sheet 19 are thoroughly cleansed and then coated with a light sensitive enamel, e.g., a cold top enamel. Coatings of uniform thickness are thus formed and dried using techniques which are well known in the art. After the light sensitive coatings have been thoroughly dried, the pattern of the plate 23 (FIG. 5) is reproduced on the first or top side of the base sheet 19 and the pattern of the film 24 (FIG. 6) is reproduced on the second or bottom side of the base sheet. In this photo-printing operation the positive plate 23 and negative film 24 are placed in registry one with the other and in contact with the respective sides of the base sheet. The exposure to actinic light may be made simultaneously at both sides. The resulting photo-printed images on the light-sensitive coatings, indicated at 26 and 27 in FIG. 7 on the base sheet 19, are then developed and dried and the remaining enamel is baked on. This leaves bare areas 28 to be electro-formed on the first or upper side of the base sheet and bare areas 29 to be etched on the opposite or second side of the sheet. Both sides are then cleansed preparatory to the electro-forming and etching treatments.

As the next step, the first side of the sheet is electroplated using a metal which is non-reactive to the etching solution which is to be used subsequently on the second side of the sheet. Thus the second metal for electroforming must have a different etching susceptibility from that of the base sheet metal. Examples of suitable metals for the electro-forming are gold, platinum, rhodium, etc. where the base sheet is copper, nickel or other metal which may be etched with a solution which is non-reactive in relation to the electro-formed film. A film 20 of uniform thickness and of the character described is thus formed on the bare areas of the first side of the base sheet. In the example illustrated, a film of from .0002 to .0003 may be applied to form the elements comprising the fine wires 13 and plated areas 20 shown in FIGS. 2, 3 and 4.

Upon completion of the plating operation a surface coat 30 is applied to the upper side of the electro-formed elements as shown in FIG. 8 in order to support these elements during the subsequent etching and handling of the article. The coat 30 may be formed from beeswax or other suitable mastic which can be removed readily from the surface of the finished article without damage to the fragile elements. After the supporting coat 30 has been applied to the wires 13 and film 20, a suitable etching agent is applied to the second or lower side of the base sheet 19 so that the bare areas thereof, as defined by the photo-printed and developed pattern of the negative film 24 are etched. If the base sheet 19 is copper or nickel a solution of ferric chloride may be used as the etching agent. The eching is continued until the aperture areas 21 shown in FIGS. 2 and 3, aperture areas 22 shown in FIG. 4 and the indexing perforations 16, 17 and 18 are extended completely through the base sheet 19 and meet the corresponding and registering aperture areas and index perforations in the electro-formed film 20. This leaves the fine wires 13 supported only by the coating 30 and the several apertures accurately delineated by the electroformed film. If additional strength and equal stress qualities are needed in the fine wires, this may be provided by adding metal by electro-plating them through the etched apertures 21 in the base sheet 19 before the coating 30 is removed from the wires. Such strengthening of extremely fine wires is particularly desirable where they have free ends, as in the case of the wires 13, in order to prevent curling when the coat 30 is removed.

The enamel 26 on the first side of the base sheet may be removed by conventional procedure either before or after the etching treatment at the second side of the base sheet 19. Finally, upon the completion of the several apertures by etching, the etching resist coating 27 is removed from the second or lower side of the base sheet 19 and the supporting coat 30 overlying the electro-formed areas may be removed by the application of heat or otherwise as required to complete the processing of the body 10.

By the foregoing procedure I am enabled to maintain exact tolerances, shapes and spacing including the formation of minute elements and apertures having sharp corners and other difficult to form angular shapes. This will be understood when it is considered that the thin electroformed elements may be given any required precisely accurate outlines by contact photo-printing procedure and that the strength required to permit handling is imparted by the etched backing or base sheet having relatively imperfect aperture forms.

I claim:

1. A method of forming a plurality of laterally spaced elongated filaments in an electroplated film which is integral with a thin metal base sheet comprising, photoprinting on a first side of said base sheet a pattern of non-conducting material precisely defining first aperture areas and filaments having further aperture areas therebetween and attached at an extremity to surrounding areas; photo-printing on the second side of said base sheet a pattern of non-conducting etching resist material defining aperture areas in registry with and underlying said defined filaments and said aperture areas on the first side of said base sheet, said pattern areas on the respective sides of said sheet being defined by positive and negative images of similar patterns, the filaments defined on said first side being omitted on said second side; at least one of the aperture areas defined by the etching resist material on the second side being larger than and underlying the areas of said defined filaments; developing said patterns to leave areas of said base sheet exposed on the first side corresponding to said filaments and said surrounding areas to be electroplated and areas of said base sheet exposed on the second side corersponding to said aperture areas to be etched including the area underlying said defined filaments; electroplating the exposed areas of only the first side of the base sheet with a second metal different from the base sheet metal, whereby the exposed areas of the first side are covered by a film of the second metal; removing the non-conducting material from said first side after electroplating; etching through the exposed areas of said second side of the base sheet with an etching agent to which said second metal is substantially non-susceptible until the defined aperture areas of the second side are extended to pass through the base sheet underlying said elongated filaments and through the aperture areas defined on said first side whereby the filaments are freed except where attached at an extremity to the surrounding areas.

2. A method in accordance with claim 1 including the step of applying a surface coat of reinforcing material to the exposed side of said electro-plated filaments prior to etching through the exposed areas of the second side of the base sheet.

References Cited in the file of this patent

UNITED STATES PATENTS

| | | |
|---|---|---|
| 378,423 | Baynes | Feb. 28, 1888 |
| 2,469,689 | Gresham | May 10, 1949 |
| 2,692,190 | Pritikin | Oct. 19, 1954 |
| 2,712,521 | Aragones et al. | July 5, 1955 |
| 2,829,460 | Golay | Apr. 8, 1958 |

FOREIGN PATENTS

| | | |
|---|---|---|
| 1,835 of 1857 | Great Britain | Jan. 1, 1858 |